Dec. 12, 1939.                G. E. NERNEY                2,182,970
                          EYEGLASS CONSTRUCTION
                          Filed Nov. 17, 1937
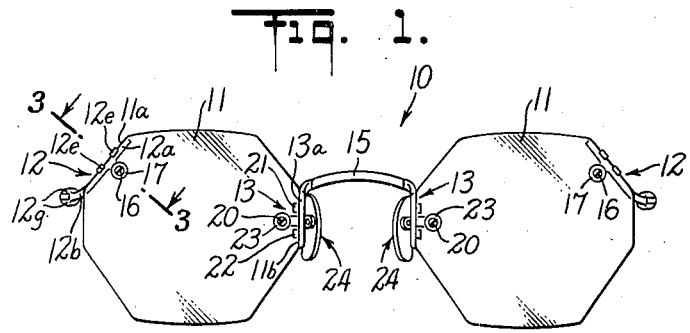
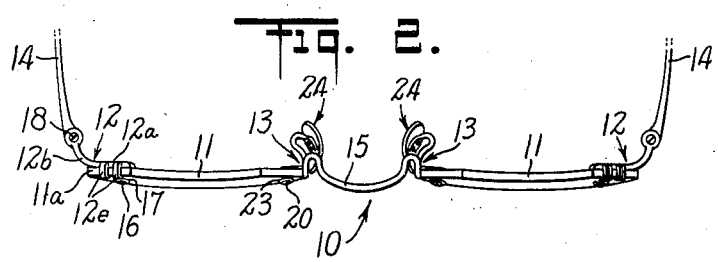
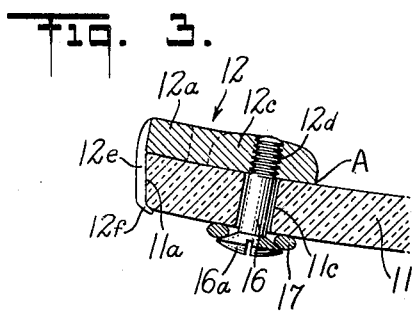
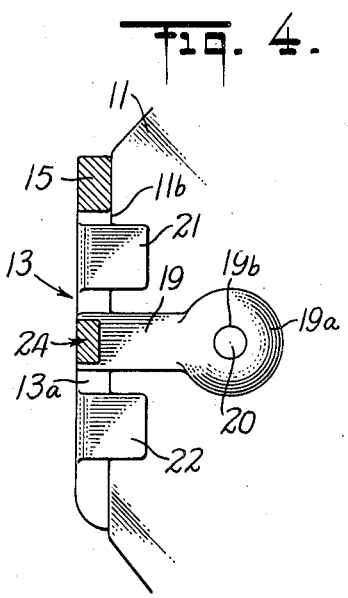
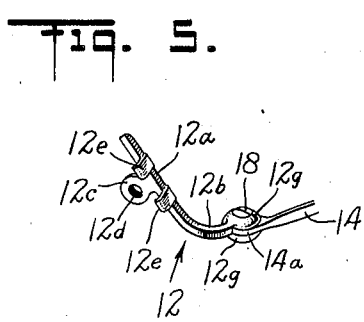
INVENTOR
George E. Nerney
BY
Blair, Curtis & Dunne
ATTORNEYS Patented Dec. 12, 1939

2,182,970

UNITED STATES PATENT OFFICE 2,182,970

EYEGLASS CONSTRUCTION

George E. Nerney, Attleboro, Mass., assignor to Bay State Optical Company, Bristol, Mass., a corporation of Maine Application November 17, 1937, Serial No. 175,009

3 Claims. (Cl. 88—47)

This invention relates to eyeglass construction and more particularly to a fitting for rimless lenses or the like.

One of the objects of this invention is to provide a fitting which is simple and inexpensive in construction, sufficiently strong though not cumbersome and thoroughly durable under rigorous and extended use. Another object is to provide a fitting of the above nature which is pleasing in appearance and which does not unduly obstruct the vision. Another object is to provide a fitting of the above nature which can be readily attached to a lens without extensive adjustment and which, when attached, does not unduly strain or tend to fracture or chip the lens. Another object is to provide a fitting of the above nature which may be quickly and inexpensively secured to the lens. Another object is to provide a fitting of the above nature which maintains its fitted position and effectively resists forces tending to change its position on the lens. Other objects will be in part apparent and in part pointed out hereinafter.

The invention accordingly consists in the features of construction, combinations of elements, and arrangements of parts as will be exemplified in the structure to be hereinafter described and the scope of the application of which will be indicated in the following claims.

In the accompanying drawing in which is shown one of the various embodiments of my invention, Figure 1 is a front elevation of my fittings as applied to a pair of lenses;

Figure 2 is a plan view of the parts shown in Figure 1;

Figure 3 is a horizontal section on an enlarged scale taken along the line 3—3 of Figure 1;

Figure 4 is a vertical section on an enlarged scale showing the rear of the fitting to which the nose guard and bridge are attached; and Figure 5 is a perspective view showing the temple fitting.

Similar reference characters refer to similar parts throughout the several views of the drawing.

As conducive to a clearer understanding of certain features of this invention, it might here be pointed out that many difficulties are encountered in providing a fitting which is both strong and pleasing in appearance and which may be secured to a lens so as to minimize fracture or chipping of the lens both during the adjusting of the part thereto and during subsequent use thereof. Many fittings of this nature are so attached to the lens that strains resulting from opening and closing the temples are concentrated at one portion of the lens which often results in fractures which destroy further usefulness of the eyeglasses. It should also be noted that rimless lenses are quite fragile and readily fracture or chip, this tendency being most pronounced nearest the edge portions and adjacent the holes which receive securing pins or screws of the fittings. It accordingly devolves upon the glazer to exercise the greatest care in attempting to fit the several parts to conform with the lens so well that undue strains on any particular portion of the lens are eliminated. The pressure exerted by a screw head or by the lens strap on the edge of the lens hole or by the screw itself on the edges of the hole where the hole in the fitting does not register with the hole in the lens often results in chipping or otherwise weakening the lens and consequently the lens connection. In many cases it is difficult to align the hole in the fitting with the hole in the lens so that the securing screw may be threaded into place with no undue strain on the lens. One of the objects of this invention is to obviate the above difficulties in addition to many others.

Referring now to the drawing and to Fig. 1 in particular, there is generally indicated at 10 a pair of eyeglasses comprising lenses 11 of the so-called toric shape. Each of lenses 11 is preferably provided with straight peripheral edge portions 11a preferably above the transverse axes of the lenses and straight edge portions 11b preferably bisected by the transverse axes of the lenses and along these edges respectively are secured fittings generally indicated at 12 and 13. As is more clearly shown in Fig. 2, fittings 12 have pivotally secured thereto temples 14. Fittings 13 have secured thereto the ends of a bridge 15 and nose guards generally indicated at 24. As each lens 11 and its fittings 12 and 13 is substantially similar to the other, only one lens and its fittings will be described in detail hereinafter.

With reference to Fig. 5, fitting 12 comprises a lens-engaging portion 12a which is formed to fit along the rear surface of lens 11 preferably adjacent straight edge portion 11a thereof. Portion 12a extends downwardly and outwardly (Fig. 1) along lens edge 11a to the end of this edge, thence outwardly of the lens, and rearwardly thereof as at portion 12b (Figs. 2 and 5).

In order to secure fitting 12 to lens 11, I provide a lug or lens strap 12c (Fig. 1) having a threaded hole 12d (Fig. 3) extending there-through. Lens 11 (Fig. 3) is provided with a hole 11c and when fitting 12 is properly fitted to the lens, fitting hole 12d and lens hole 11c are in registry to receive a screw 16, which extends through the lens hole and is threaded into fitting hole 12d. As may be more clearly seen in Fig. 1, screw 16 preferably extends through lens 11 at a point spaced substantially above the transverse axis of the lens, that is fitting 12 is secured to lens 11 in the so-called "Ful-Vue" position so as to cause minimum obstruction to the vision. Interposed between head 16a of screw 16 and the front surface of lens 11, I preferably provide a washer 17 or the like which is preferably substantially oval in cross section and is of larger diameter than lens hole 11c. Thus when screw 16 is taken up to secure fitting 12 to the lens, there is no pressure exerted by the head of the screw on the lens immediately adjacent lens hole 11c, and hence the risk of chipping the lens at this portion is greatly minimized.

In order to prevent fitting 12 from pivoting about screw 16 as an axis when temple 14 is unfolded or folded and also to prevent lens sag when the eyeglasses are being worn, I have provided straps 12e (Fig. 5) which are preferably disposed one on each side of lens strap 12c. While straps 12e are preferably quite rigid so as to avoid casual bending thereof, they may be bent during the adjusting of fitting 12 to the lens; thus the fitting may be properly positioned upon the lens so that fitting hole 12d and lens hole 11c register to permit assembly with screw 16 while avoiding such contact between the screw and the sides of lens hole 11c as might subject the lens to undue strains.

As is more clearly shown in Fig. 3, fitting straps 12e are seated on and abut lens edge 11a which is preferably slightly curved. Straps 12e are thus in effect gripping members, the ends 12f of which grip front portions of the lens edge to prevent pivotal movement rearwardly of fitting 12 about point A as an axis, and likewise prevent undue pressures being exerted against the portions of the lens adjacent the lens hole 11c by the tendency of the screw 16 to be pulled through the lens hole during such pivotal movement.

As pointed out above, portion 12a of fitting 12 (Fig. 1) is preferably substantially straight and, when assembled with the lens, lies in the plane of the rear surface thereof, portion 12b (Fig. 2) of the fitting curving outwardly and rearwardly of the lens and terminating in a pair of lugs 12g (Fig. 5). Temple 14 has formed on one end thereof an eye portion 14a which fits between fitting lugs 12g. A screw 18 or the like extends through holes which are provided in fitting lugs 12g and temple hole 14a and secures the temple and fitting together in pivotal relation.

It may now be seen that when temple 14 (Fig. 1) is unfolded a certain amount of the strains resulting from such movement is exerted against the lens by the lower portion of fitting portion 12a near that point of the fitting where portion 12b thereof curves away from the lens and is thus borne by the portion of the lens adjacent such portion of the fitting. The rest of the strains resulting from unfolding the temple tend to pull the uppermost of fitting straps 12e away from its seated position and tend to pull the head of screw 16 through lens hole 11c. Thus, these latter strains are disposed over portions of the lens adjacent lower fitting strap 12e (Fig. 3) and adjacent washer 17. From this it will be seen that the strains are not concentrated on any one part of the lens but are well distributed over a substantial portion thereof which is well able to bear and stand up under such conditions of use.

During the folding of the temple other strains are exerted. These strains cause the top of fitting portion 12a (Fig. 1) to bear against portions of the lens adjacent thereto; cause lower fitting strap 12e to bear against the portion of the lens edge 11a lying thereunder; and cause fitting lug 12c not only to bear against the portions of lens 11 adjacent thereto but also tend to pull the head of screw 16 through lens hole 11c. Here again it will be seen that the forces resulting from folding the temple are distributed over a substantial portion of the lens rather than being concentrated at one portion thereof, thus providing a strong and durable connection between the fitting and the lens.

It may also be seen that inasmuch as fitting portion 12a lies along the rear surface of lens 11, the unsightliness of a portion of a fitting lying along the edge of the lens is avoided.

Referring now to Fig. 1, fitting 13 to which one end of bridge 15 is attached is provided with a portion 13a (Fig. 4) which, when the fitting is in assembled position, lies along edge 11b of lens 11. Extending preferably from the center portion of 13a is a lens strap 19 having formed on the end thereof a lug 19a through which extends a hole 19b. Hole 19b is preferably threaded and registers with a contiguous hole in lens 11 through both of which extend a screw 20 (Fig. 1) which is threaded into fitting lug 19a to secure fitting 13 and lens 11 together in related assembly.

Portion 13a (Fig. 4) of fitting 13 is preferably of substantial length so that each end thereof extends a substantial distance away from each side of lens strap 19 thus effectively preventing pivoting of fitting 13 and lens strap 19 about screw 20 as an axis. On opposite sides of lens strap 19 and preferably integrally formed with fitting portion 13a, I provide a pair of straps or ears 21 and 22. During the adjusting of fitting 13 to lens 11, ears 21 and 22, although being substantially rigid, may be bent so as to lie snugly against the rear surface of lens 11. Hence when temples 14 are unfolded from their closed position, various strains result on the connection between fitting 13 and lens 11. Ears 21 and 22 and strap 19, all of which bear against the rear surface of the lens adjacent lens edge 11b thereof, distribute these strains over a substantial area of the portion of the lens adjacent fitting 13. Accordingly the lens is well able to withstand these strains and the danger of fracturing or chipping the lens is greatly minimized. Further to distribute such strains, particularly about the portion of the lens adjacent the head of screw 20, I preferably dispose a washer 23 (Fig. 1) between the head of screw 20 and the portions of the lens adjacent the hole through which the screw extends, washer 23 preferably being similar to washer 17 (Fig. 3).

It may now be seen that I have provided fittings for temples 14 and bridge 15 which may readily be secured to a lens with a minimum amount of trouble and without the strains on the lens usually attending such fitting. These fittings distribute rather than concentrate the strains to which the lenses are subjected during opening and closing of the temples and while the eyeglasses are being worn. The most fragile portions of the lens, that is those portions immediately adjacent fittings 12 and 13 thus receive a distribution of strains rather than a concentration thereof.

Accordingly I have provided an end piece construction in which the several objects hereinabove set forth in addition to many others have been achieved in a thoroughly practical and efficient manner.

As many possible embodiments may be made of the above invention and as many changes might be made in the embodiment above set forth, it is to be understood that all matter hereinbefore set forth, or shown in the accompanying drawing, is to be interpreted as illustrative and not in a limiting sense.

I claim:

1. In eyeglass construction, in combination, a lens, a fitting secured to said lens at a point spaced above the transverse axis thereof, said fitting including a body portion which engages the rear surface of said lens, extends downwardly therealong, thence outwardly and rearwardly therefrom and terminating at a point spaced to the rear of and exteriorly of one edge of said lens, said fitting including a strap extending from said body portion and lying along the rear surface of said lens, a pair of lugs extending from said body portion, one on each side of said strap and engaging in clamping relation portions of the edge of said lens, a pair of lugs formed on the spaced end of said body portion, and a temple pivotally connected to said lugs.

2. In eyeglass construction, in combination, a lens; a fitting secured to said lens including a body portion which engages the rear surface of said lens, extends downwardly therealong, thence outwardly and rearwardly therefrom with its free end located to the rear of said lens, said body portion having an eyelet resting on the rear surface of said lens, and lugs extending from said body portion around the edge of said lens to engage the front surface thereof and to support said fitting; a fastening element extending through said eyelet and said lens, and a temple pivotally connected to said end of said body portion.

3. In eyeglass construction, in combination, a lens; a fitting secured to said lens including a body portion which engages the rear surface of said lens, extends downwardly therealong, thence outwardly and rearwardly therefrom with its free end located to the rear of said lens, said body portion having an eyelet resting on the rear surface of said lens, a pair of lugs extending from said body portion to engage the edge and front surface of said lens, one of said lugs being located on each side of said eyelet; a fastening element extending through said eyelet and said lens, and a temple pivotally connected to said end of said body portion.

GEORGE E. NERNEY.

CERTIFICATE OF CORRECTION.

Patent No. 2,182,970. December 12, 1939.

GEORGE E. NERNEY.

It is hereby certified that the address of the assignee in the above numbered patent was erroneously described and specified as "Bristol, Massachusetts" whereas said address should have been described and specified as Attleboro, Massachusetts, as shown by the record of assignments in this office; and that the said Letters Patent should be read with this correction therein that the same may conform to the record of the case in the Patent Office.

Signed and sealed this 2nd day of April, A. D. 1940.

(Seal)

Henry Van Arsdale,
Acting Commissioner of Patents.